Feb. 9, 1937.          H. J. LOUNSBURY          2,070,017
                            HAND BRAKE
                       Filed March 23, 1935
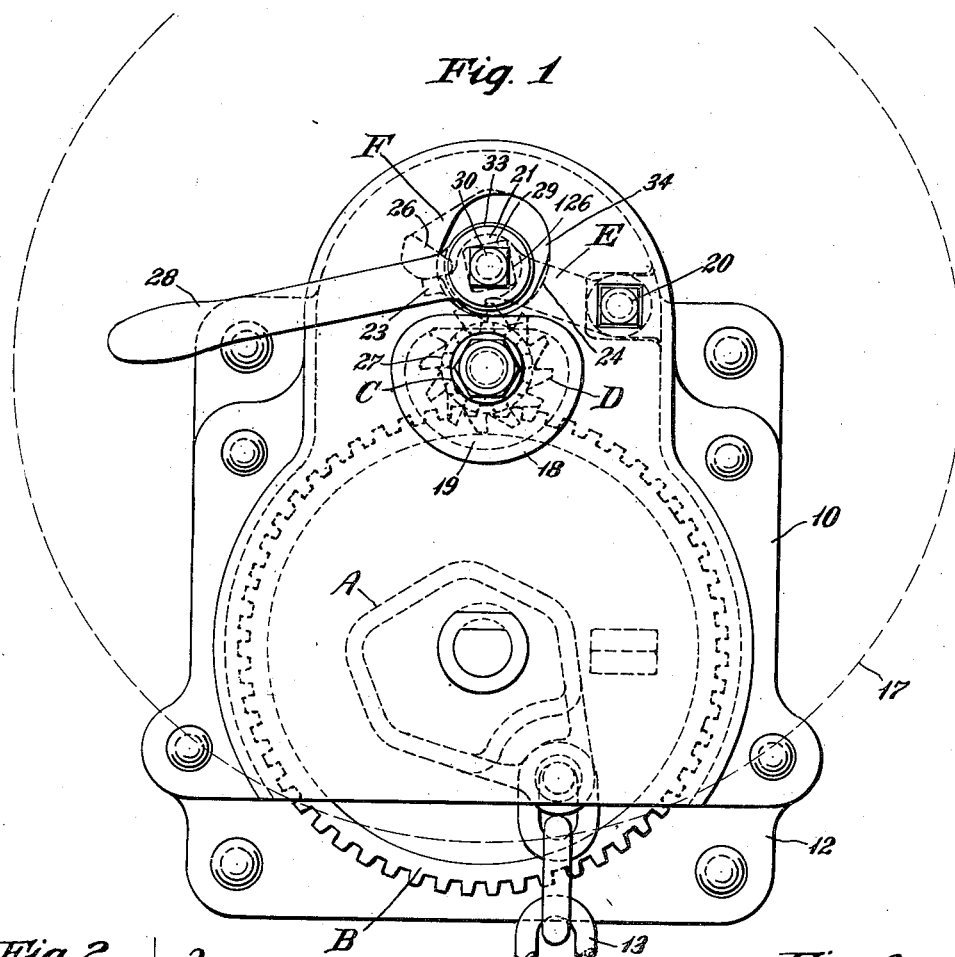
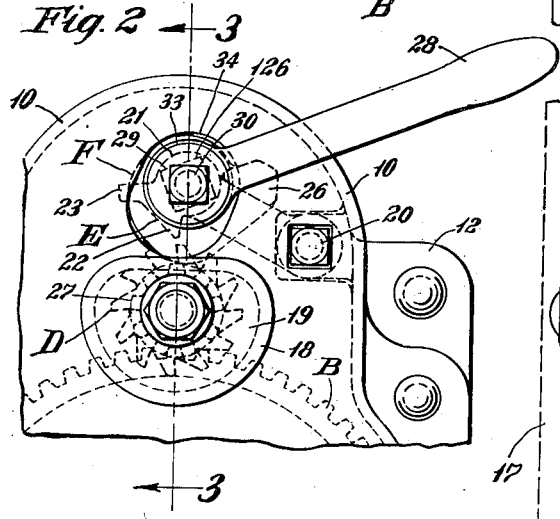
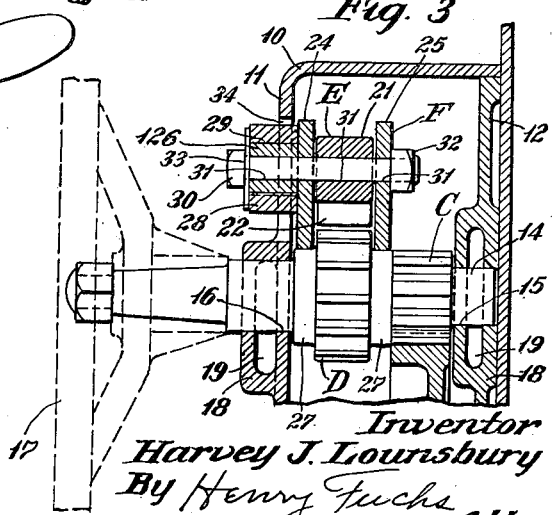
Inventor
Harvey J. Lounsbury
By Henry Fuchs
        Atty.

Patented Feb. 9, 1937

2,070,017

UNITED STATES PATENT OFFICE 2,070,017

HAND BRAKE

Harvey J. Lounsbury, Glen Ellyn, Ill., assignor to W. H. Miner, Inc., Chicago, Ill., a corporation of Delaware Application March 23, 1935, Serial No. 12,585

20 Claims. (Cl. 188—81.1)

This invention relates to improvements in hand brakes for railway cars.

One object of the invention is to provide a hand brake mechanism of the power multiplying gear operated type, especially adapted for railway cars, comprising a ratchet and cooperating locking dog for holding the mechanism against movement in brake releasing direction, wherein means is provided for forcibly disengaging the dog from the ratchet to assure release of the brakes.

A more specific object of the invention is to provide a mechanism of the character set forth in the preceding paragraph, wherein the means for releasing the dog is in the form of a lever operated eccentric for forcibly prying the locking dog free of the teeth of the ratchet means, thereby successfully overcoming the forces tending to hold the dog locked to the ratchet member.

Another object of the invention is to provide a releasing means for the locking dog of a geared hand brake, wherein the releasing means includes the lever actuated mechanism directly connected to and forming a part of the dog for effecting movement of the dog in reverse direction to either force the dog into or out of engagement with the cooperating locking means of the brake and also maintain the dog in either engaged or disengaged position.

Other objects of the invention will more clearly appear from the description and claims hereinafter following.

In the drawing forming a part of this specification, Figure 1 is a front elevational view of a hand brake mechanism, illustrating my improvements in connection therewith, the mechanism being shown in the position it occupies when applied to the end wall of a railway car. Figure 2 is a broken view, similar to Figure 1, illustrating the upper part of the brake mechanism with the operative parts thereof in different positions. Figure 3 is a vertical sectional view, corresponding substantially to the line 3—3 of Figure 2.

As illustrated in the drawing, my improved hand brake mechanism is preferably enclosed within a housing 10, which is secured to the vertical end wall of the car. The housing has vertically disposed, spaced front and back walls 11 and 12 and is open at the bottom to accommodate the usual brake chain 13 for movement.

My improved hand brake mechanism proper comprises broadly a chain winding member A; a gear B rotatable with said member; a pinion C meshing with the gear; a ratchet wheel D rotatable with the pinion; a locking dog E cooperating with the ratchet wheel; and a manually actuated member F connected to the dog for moving the latter into and out of engagement with the ratchet wheel.

The chain winding drum A, which is in the form of a rotary drum, and the gear B are preferably made integral, and may be in the form of a casting. The drum A and the gear B are supported for rotation about a horizontal axis in suitable bearing means, not shown, formed on the housing. The chain 13 has the end link thereof connected to the drum, in any well-known manner, so that the chain will be wound upon the drum when the latter is rotated in the proper direction. As will be understood by those skilled in this art, the chain 13 is operatively connected to the brake mechanism proper of the car to effect application of the brakes.

The pinion C is shown as formed integral with a shaft member 14, which also carries the ratchet wheel D. The ratchet wheel D is preferably also formed integral with the shaft 14. At the inner end, the shaft is journaled in a bearing member 15 provided on the back wall 12 of the housing. The shaft projects through a bearing member 16 provided in the front wall 11 of the housing and has a hand wheel 17 fixed to the outer end thereof. The hand wheel is indicated in dotted lines in Figures 1 and 3. The front and rear walls 11 and 12 of the housing are thickened adjacent to the bearings 15 and 16, as indicated at 18—18, said thickened portions being provided with chambers 19—19 adapted to hold any suitable lubricant for lubricating the bearings 15 and 16.

The locking dog E is pivotally supported on a bolt 20 fixed to the housing and is enlarged at the outer end, as indicated at 21, said enlargement being preferably of cylindrical form. At said enlarged portion, the dog has a depending tooth 22, which is engageable with the teeth of the ratchet wheel D. To the left of the tooth 22 and above the same, as viewed in Figure 1, the enlargement 21 has an outstanding lug 23 for a purpose hereinafter pointed out. The manually actuated member F for moving the dog into and out of engagement with the ratchet wheel comprises two laterally spaced, eccentric, platelike sections 24 and 25 connected at the left, as viewed in Figure 1, by a filler section 26 formed integral with said eccentric plate sections. These plate sections are of the outline shown in Figure 1 so as to properly cooperate with the periphery of the shaft 14 to elevate and lower the dog E, as hereinafter pointed out. The plate section 24 has an outstanding, integral, square boss 126 thereon for a purpose hereinafter set forth. The plate sections 24 and 25 straddle the dog, as clearly shown in Figure 3, and are supported on cylindrical portions 27—27 in the form of enlarged sections on the shaft 14 at opposite sides of the ratchet wheel D. The enlarged sections 27—27 are, in effect, projecting hub portions of the ratchet wheel D.

The dog actuating member F includes a lever arm 28, which is fixed to the boss 126 of the plate section 24, the inner end of the arm 28 being provided with a square opening 29 within which the boss 126 is seated. The member F is pivotally connected to the enlarged portion 21 of the dog by means of a bolt 30 extending through aligned openings 31—31 in the enlargement 21 of the dog and the plate sections 24 and 25 and the boss 126 of the member F. The bolt 30 is secured in place by a nut 32 threaded on the inner end of the bolt. The head of the bolt bears on a washer 33, which engages the outer side of the lever arm 28 and holds the arm in secured position on the boss 126.

As will be clear upon reference to Figure 1, the filler section 26 forms a stop member adapted to engage the lug 23 of the dog E to limit the downward swinging movement of the actuating member F and the weight of the lever arm 28 is added to the weight of the dog to hold the latter in ratcheting engagement with the ratchet wheel D. As will be evident upon reference to Figure 2, the stop member 25 is so positioned that movement of the actuating member F will be arrested by engagement of said member with the upper face of the dog when the member F is swung to the extreme right hand position shown in said figure. As the lever arm 28 is rotated from the position shown in Figure 1 to that shown in Figure 2, the eccentric plate sections 24 and 25, which have sliding bearing contact with the sections 27—27 of the shaft, will force the dog to swing upwardly, thereby prying the same free of the teeth of the ratchet wheel D. As clearly shown in Figures 1, 2, and 3, the outer wall 11 of the housing is provided with an elongated opening 34 to accommodate the hub of the lever arm 28 for free upward and downward movement while the dog is being moved into and out of engagement with the ratchet wheel and during the time that the dog is ratcheting over the teeth of said wheel.

The operation of my improved hand brake mechanism is as follows in tightening the brakes, assuming that the parts are in the position shown in Figure 1: The hand wheel is rotated in right hand direction, thereby rotating the shaft 14 in a right hand direction as viewed in Figure 1. Inasmuch as the pinion C is fixed to the shaft 14, rotation of the shaft will effect rotation of the gear B in a left hand direction, thereby rotating the drum A to wind the chain 13 thereon. During this winding action, the dog E will ratchet over the wheel D and when the brake is fully tightened the locking tooth of the dog will hold the ratchet wheel D and the pinion C against rotation, thereby holding the chain winding drum A against rotation in unwinding direction. As will be evident, during the ratcheting action of the dog E, the same is held in engagement with the tooth due to the action of gravity on said dog and the lever arm 28 of the throw out mechanism F. As hereinbefore pointed out, through shouldered engagement between the throw out mechanism F and the dog E by engagement of the part 26 with the lug 23 of the dog, the weight of the lever 28 is added to that of the dog E to hold the same in operative engagement with the ratchet teeth of the ratchet wheel D. It is also pointed out that upward swinging movement of the dog E and the lever arm 28, together with the hub of the lever 28, is permitted during ratcheting action by the guide opening 34 in the wall 11 of the housing. To release the brakes, the lever 28 is swung upwardly, thereby throwing the projecting cam portions of the platelike sections 24 and 25 of the throw out mechanism F into bearing engagement with the cylindrical sections 27—27 of the shaft 14 and forcing the dog upwardly to free the tooth thereof from the ratchet wheel D. When the lever arm 28 has been swung to the position shown in Figure 2, the dog will be forced entirely clear of the teeth of the ratchet wheel D, as shown in said figure, and maintained in said position by the projecting eccentric portions of the plate sections 24 and 25. As shown in Figure 2, movement of the lever 28 in the released position of the dog E will be arrested by engagement of the stop 26 with the upper edge face of the dog. As will be evident, when the dog has been completely freed from engagement with the ratchet wheel D, the parts of the brake will be free to rotate, thereby permitting complete unwinding of the chain 13 from the drum A and full release of the brakes. To restore the dog E to operative engagement, the lever arm 28 is swung from the position shown in Figure 2 to the position shown in Figure 1, thereby retracting the projecting eccentric portions of the plate sections 24 and 25 of the throw out mechanism F from active engagement with the cylindrical surfaces 27—27 of the shaft 14 and permitting the dog E to drop to the engaging position shown in Figure 1. Movement of the lever arm 28 is arrested by engagement of the stop 26 with the lug 23 on the dog E. As will be evident, in case the dog does not engage properly with the teeth of the ratchet wheel D, due to some obstruction, such as snow or ice, being wedged between the teeth, the locking tooth 22 of the dog may be forcibly brought into engagement between the teeth of the ratchet wheel D by pressing downwardly on the handle lever 28.

I have herein shown and described what I now consider the preferred manner of carrying out my invention, but the same is merely illustrative and I contemplate all changes and modifications that come within the scope of the claims appended hereto.

I claim:

1. In a ratchet mechanism for hand brakes, the combination with a rotary element; of means for holding said element against rotation in one direction including a pivoted locking dog; a lever pivoted to said dog for rotation about a fixed axis with respect to said dog, said lever having eccentric means thereon for forcing said dog out of locking engagement; and abutment means engaged by said eccentric means.

2. In a ratchet mechanism, the combination with a rotary element; of means for holding said element against rotation in one direction including a locking dog; a member pivoted on said dog, said member having a projection eccentric to the pivot thereof; abutment means on which said eccentric projection bears; and a lever on said pivoted member for moving said member about its pivotal axis to force said dog out of locking engagement by the action of said eccentric projection on said abutment means.

3. In a ratchet mechanism, the combination with a rotary element; of means for holding said element against rotation in one direction, including a pivoted locking dog; means for swinging said dog on its pivot to move the same into and out of locking engagement, including a rotatable member having an eccentric pivotal connection with the dog at a fixed point on the latter, and an abutment engaged by said eccentric; and a lever for rotating said member.

4. In a ratchet mechanism, the combination with a rotary element; of means for holding said element against rotation in one direction, including a pivoted locking dog; cam means for swinging said dog on its pivot to move the same into and out of locking engagement, including a rotatable cam member journaled on a fixed axis on the dog; and a lever fixed to said rotatable member for actuating the same.

5. In a ratchet mechanism, the combination with a rotary element; of a fixed support on which said element is journaled; means for holding said element against rotation in one direction including a locking dog; means for moving said dog into and out of locking position, including a rotatable member mounted on said dog for bodily movement therewith with respect to said support and having an eccentric pivotal connection with said dog; and means for rotating said member.

6. In a ratchet mechanism, the combination with a rotary element; of a support on which said element is journaled; ratchet means cooperating with said element for holding the latter against rotation in one direction, said ratchet means including a ratchet wheel connected to said element and a locking dog, said dog being pivoted at one end on said support and having a tooth portion at the other end engageable with the ratchet wheel; and a rotatable operating member bodily movable with said dog with respect to said support and eccentrically pivoted to the dog at the tooth end of the latter for swinging said dog on its pivot to bring the same into and out of operative engagement with the ratchet means.

7. In a ratchet mechanism, the combination with a ratchet wheel; of means for holding said wheel against rotation in one direction, said ratchet means including a locking dog pivoted at one end and having toothed engagement at the other end with said ratchet wheel; a rotary member having an eccentric pivotal connection with said dog at the tooth end thereof; a lever for actuating said rotary member to engage said dog with said ratchet wheel and disengage the same therefrom; and stop means for limiting the rotary movement of said member with respect to the dog in two different positions to arrest movement of said member respectively when said dog is in operative engagement with the ratchet wheel and when disengaged therefrom.

8. In a ratchet mechanism, the combination with a ratchet wheel; of a dog cooperating with said ratchet wheel for holding the latter against rotation in one direction, said ratchet wheel having a cylindrical hub portion, said dog being pivoted at one end and having toothed engagement at the other end with said ratchet wheel; and an eccentric member rotatably connected to said dog at said toothed end thereof, said eccentric member bearing on said cylindrical hub portion of the ratchet wheel.

9. In a ratchet mechanism, the combination with a rotary element having ratchet teeth; of a locking dog cooperating with said rotary element for holding the latter against rotation in one direction, said rotary element having a cylindrical hub portion, said dog being pivoted at one end and having a rotary member pivoted to the other end, said dog having a tooth engageable with said ratchet teeth of said element, said rotary member having bearing engagement on said hub portion of said element and being provided with an eccentric portion engageable with said hub portion for forcing the dog away from the rotary element and freeing the tooth thereof from the teeth of said rotary element and holding said dog in disengaged position; a lever fixed to said rotary member for actuating the same; and abutment means on said rotary member engageable with the dog for forcing said dog into engagement with the ratchet wheel.

10. In a ratchet mechanism, the combination with a rotary element; of means for holding said element against rotation in one direction, said means including a ratchet wheel member, a cooperating locking dog, and a rotary shaft on which said ratchet wheel member is fixed, said dog being pivoted at one end and having a tooth at the other end engageable with said ratchet wheel member; and means for operating said dog including a rotary member, and a fixed operating handle lever on said rotary member, said rotary member being pivoted on said dog for rotation about a fixed axis with respect to said dog, said rotary member bearing on the periphery of said shaft and having an eccentric portion engageable with the periphery of said shaft for forcing the dog away from said ratchet wheel member and freeing the tooth thereof from the teeth of said ratchet wheel member.

11. In a ratchet mechanism, the combination with a rotary element, rotatable about a horizontal axis; of means for rotating said element including a rotary shaft having a ratchet wheel thereon; a locking dog pivoted at one end and having a tooth at the other end engageable with said wheel from above to hold the wheel against rotation; means for actuating said dog including a rotatable member bearing on said shaft, said rotatable member having an eccentric pivotal connection with said dog adjacent to the tooth of the latter; and a lever for actuating said rotary member.

12. In a ratchet mechanism, the combination with a rotary element, rotatable about a horizontal axis; of means for rotating said element including a member rotatable about a horizontal axis; a ratchet wheel fixed on said member and rotatable therewith; a dog above said ratchet wheel, said dog having a tooth at one end engageable with said ratchet wheel; means for pivotally supporting the dog at the other end for swinging movement about said pivotal support; means pivoted on the dog having an eccentric portion engageable with said rotary member for lifting said dog free of the ratchet wheel and supporting said dog in released position; and an operating handle lever for rotating said pivoted means.

13. In a ratchet mechanism, the combination with a rotary element, rotatable about a horizontal axis; of means for rotating said element including an actuating member rotatable about a horizontal axis; a ratchet wheel fixed to said actuating member, said ratchet wheel having a cylindrical hub portion; a second rotary member above said ratchet wheel, said second rotary member having peripheral bearing engagement with the cylindrical surfaces of said hub portion and being supported on said hub portion; an operating handle fixed to said second named rotary member for rotating the latter; a locking dog above said ratchet member having a tooth at one end engageable with the ratchet wheel, said dog being pivotally supported at the other end for swinging movement; and a pivotal connection between said second named member and said dog, said pivotal connection being rotatable on a fixed axis with respect to the dog, said pivotal connection being eccentric to said second named rotary member.

14. In a ratchet mechanism, the combination with an element, rotatable about a horizontal axis; of means for rotating said element including a rotary actuating member also rotatable about a horizontal axis; a ratchet wheel fixed to said rotary member, said ratchet wheel having a cylindrical hub portion; a locking member for holding said element against rotation in one direction, said locking member including an arm pivoted at one end for swinging movement and having the other end extending over said ratchet wheel, and a second arm pivoted to said last named end of said first named arm, said first named arm having a depending tooth at said second named end thereof engageable with the ratchet wheel, and a stop shoulder spaced from said tooth, said second named arm being manually swingable upwardly and downwardly in reverse directions and having stop means associated therewith engageable with the stop means of said first named arm when said second named arm is swung downwardly to thereby arrest pivotal movement of said arms in said downward direction to force the first named arm to swing downwardly on its pivot toward said ratchet wheel to engage the tooth thereof with the ratchet wheel; and an eccentric member for supporting said arms on the hub portion of said ratchet wheel, said eccentric member being fixed to said second named arm for rotation on the axis of the pivotal connection between said arms, said eccentric member having peripheral bearing engagement with the cylindrical surface of said hub portion and forcing said first named arm to swing away from the ratchet wheel when said second named arm is swung upwardly to forcibly free the tooth of the first named arm from said ratchet wheel.

15. In a ratchet mechanism, the combination with a rotary element, rotatable about a horizontal axis; of means for rotating said element including a rotary actuating member rotatable about a horizontal axis; a ratchet wheel fixed to said rotary member, said rotary member having a peripheral cylindrical bearing surface; a locking dog pivoted at one end for swinging movement about the pivotal axis thereof, the other end of said dog extending over the ratchet wheel and having a tooth engageable with the teeth of said ratchet wheel; a lever pivoted to the tooth end of the dog for swinging movement to opposite sides of a vertical plane coincident with the pivotal axis of said lever; and an eccentric fixed to said lever and supported on the periphery of said cylindrical bearing surface of said rotary member, said eccentric being rotatable about the axis of pivotal connection between the lever and said dog, said lever when swung to one side of said vertical plane rotating the eccentric to raise said dog free of the ratchet and when swung to the other side of said vertical plane lowering the dog into engaged position with respect to said ratchet wheel.

16. In a ratchet mechanism, the combination with a rotary element, rotatable about a horizontal axis; of means for rotating said element including a rotary actuating member rotatable about a horizontal axis; a ratchet wheel fixed to said rotary member, said rotary member having a peripheral cylindrical bearing surface; a locking dog pivoted at one end for swinging movement about the pivotal axis thereof, the other end of said dog extending over the ratchet wheel and having a tooth engageable with the teeth of said ratchet wheel; a lever pivoted to the tooth end of the dog for swinging movement to opposite sides of a vertical plane coincident with the pivotal axis of said lever; an eccentric fixed to said lever and supported on the periphery of said cylindrical bearing surface of said rotary member, said eccentric being rotatable about the axis of pivotal connection between the lever and said dog, said lever when swung to one side of said vertical plane rotating the eccentric to raise said dog free of the ratchet and when swung to the other side of said vertical plane lowering the dog into engaged position with respect to said ratchet wheel; and means fixed with respect to said lever having shouldered engagement with the dog when the lever is swung in said last named direction to positively force said dog into engagement with said ratchet wheel.

17. In a ratchet mechanism, the combination with a rotary element, rotatable about a horizontal axis; of means for rotating said element including a rotary actuating member rotatable about a horizontal axis; a ratchet wheel fixed to said rotary member, said rotary member having a peripheral cylindrical bearing surface; a locking dog pivoted at one end for swinging movement about the pivotal axis thereof, the other end of said dog extending over the ratchet wheel and having a tooth engageable with the teeth of said ratchet wheel; a lever pivoted to the tooth end of the dog for swinging movement to opposite sides of a vertical plane coincident with the pivotal axis of said lever; an eccentric fixed to said lever and supported on the periphery of said cylindrical bearing surface of said rotary member, said eccentric being rotatable about the axis of pivotal connection between the lever and said dog, said lever when swung to one side of said vertical plane rotating the eccentric to raise said dog free of the ratchet and when swung to the other side of said vertical plane lowering the dog into engaged position with respect to said ratchet wheel; and stop means fixed with respect to said lever having shouldered engagement with the dog when the lever is swung to either side of said vertical plane to arrest pivotal movement of the lever with respect to the dog.

18. In a ratchet mechanism, the combination with a ratchet wheel rotatable about a horizontal axis, said ratchet wheel having a cylindrical hub portion; of a dog having a tooth end extending over said ratchet wheel and engageable with the teeth thereof, said dog being pivotally supported at the other end; an actuating lever pivoted to said toothed end of the dog; and an eccentric fixed with respect to the lever and rotatable about the axis of pivotal connection of said lever with the dog, said eccentric resting on and having peripheral bearing engagement with the cylindrical surface of the hub of said ratchet wheel and lifting said dog upwardly to free the tooth thereof from the teeth of the ratchet wheel when said eccentric is rotated.

19. In a ratchet mechanism, the combination with a ratchet wheel; of a rotary shaft to which said wheel is fixed, a locking dog pivoted at one end for swinging movement and having a tooth at the other end engageable with said ratchet wheel; supporting means for the tooth end of said dog comprising a rotary eccentric having peripheral bearing engagement with said shaft; means for pivotally connecting said eccentric to said dog for rotation about a fixed axis with respect to the dog; and an operating handle lever fixed to said eccentric for actuating the same to pry the dog free of the teeth of the ratchet wheel.

20. In a ratchet mechanism, the combination with a rotary shaft; of a ratchet wheel on said shaft; a gravity actuated dog pivoted at one end and having operative toothed engagement with the ratchet wheel at the other end for holding said ratchet wheel against rotation in one direction; means for freeing said dog from engagement with the teeth of the ratchet wheel, including an operating lever pivoted to the toothed end of the dog; and an eccentric actuated by said lever, said eccentric bearing on said shaft and being rotatable about the axis of pivotal connection between the dog and lever.

HARVEY J. LOUNSBURY.